(12) United States Patent
Garcia et al.

(10) Patent No.: US 12,276,179 B2
(45) Date of Patent: *Apr. 15, 2025

(54) INTELLIGENT POWER MANAGEMENT SYSTEM

(71) Applicant: Schlumberger Technology Corporation, Sugar Land, TX (US)

(72) Inventors: Mateo Garcia, Houston, TX (US);
Shunfeng Zheng, Katy, TX (US);
Seetharam Kothuru, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,920

(22) Filed: Mar. 4, 2024

(65) Prior Publication Data

US 2024/0209717 A1 Jun. 27, 2024

Related U.S. Application Data

(63) Continuation of application No. 16/655,396, filed on Oct. 17, 2019, now Pat. No. 11,920,438.

(51) Int. Cl.
*G05B 13/04* (2006.01)
*E21B 41/00* (2006.01)
*E21B 44/00* (2006.01)

(52) U.S. Cl.
CPC .............. *E21B 41/00* (2013.01); *E21B 44/00* (2013.01); *G05B 13/042* (2013.01)

(58) Field of Classification Search
USPC ........................................................ 700/287
See application file for complete search history.

(56) References Cited

U.S. PATENT DOCUMENTS

| | | |
|---|---|---|
| 6,639,331 B2 | 10/2003 | Schultz |
| 8,519,565 B2 | 8/2013 | Dozier |
| 8,975,767 B2 | 3/2015 | Algrain |
| 9,059,587 B2 | 6/2015 | Williams |
| 9,197,071 B2 | 11/2015 | Williams |

(Continued)

FOREIGN PATENT DOCUMENTS

| | | |
|---|---|---|
| CN | 106598720 A | 4/2017 |
| WO | 2018213925 A1 | 11/2018 |
| WO | 2019051439 A1 | 3/2019 |

OTHER PUBLICATIONS

JP WO2011129054 A1 (Year: 2013).*

(Continued)

*Primary Examiner* — Hien D Khuu
(74) *Attorney, Agent, or Firm* — Jeffrey D. Frantz

(57) ABSTRACT

A method may include obtaining, from a digital drilling program and by a drilling management network, a drilling operation sequence of the drilling rig. The drilling management network is coupled to a drilling rig, rig equipment, and various electric power generators. The method may further include determining, by the drilling management network, a power management sequence that matches an electric power capacity of the drilling rig to an electric power consumption of the rig equipment. The method may further include executing, by the drilling management network, the power management sequence to the rig equipment and the electric power generators.

18 Claims, 6 Drawing Sheets

(56) References Cited

U.S. PATENT DOCUMENTS

| | | |
|---|---|---|
| 9,240,687 B2 | 1/2016 | Carralero |
| 9,644,431 B2 | 5/2017 | Myers |
| 9,803,461 B2 | 10/2017 | Boone |
| 9,806,530 B2 | 10/2017 | Martinez |
| 10,017,993 B2 | 7/2018 | Hu |
| 10,151,178 B2 | 12/2018 | Stephenson |
| 10,243,371 B2 | 3/2019 | Gerdes |
| 10,309,166 B2 | 6/2019 | Thiemann |
| 11,066,902 B2 | 7/2021 | Zhang |
| 11,188,045 B2 | 11/2021 | Reddy |
| 11,541,763 B2 | 1/2023 | Zhang |
| 2008/0203734 A1 | 8/2008 | Grimes |
| 2009/0312885 A1 | 12/2009 | Buiel |
| 2012/0049625 A1 | 3/2012 | Hopwood |
| 2013/0007515 A1 | 1/2013 | Shaw |
| 2013/0234515 A1* | 9/2013 | Boone .................. E21B 44/00 307/43 |
| 2014/0008988 A1 | 1/2014 | Clarke et al. |
| 2014/0103727 A1 | 4/2014 | Taimela |
| 2014/0354081 A1 | 12/2014 | Li |
| 2016/0003035 A1 | 1/2016 | Logan et al. |
| 2016/0145974 A1 | 5/2016 | Tahoun |
| 2016/0178678 A1 | 6/2016 | Pelletier |
| 2016/0380560 A1 | 12/2016 | Torrey |
| 2017/0133852 A1 | 5/2017 | MacDonald |
| 2017/0211338 A1 | 7/2017 | Myers |
| 2017/0222409 A1* | 8/2017 | Oehring .................. H02B 7/06 |
| 2017/0234250 A1 | 8/2017 | Janik |
| 2018/0034280 A1 | 2/2018 | Pedersen |
| 2018/0066506 A1 | 3/2018 | Boone |
| 2018/0109110 A1 | 4/2018 | Gerdes |
| 2019/0267805 A1 | 8/2019 | Kothuru |
| 2020/0362690 A1* | 11/2020 | Zhang .................. E21B 47/12 |
| 2021/0115762 A1 | 4/2021 | Garcia |

OTHER PUBLICATIONS

JP 6004683 B2 (Year: 2016).*
JP-7423977-B2 (Year: 2024).*
KR-100568622-B1 (Year: 2006).*
Search Report and Written Opinion of counterpart International Patent Application No. PCT/2020/070654, dated Jan. 29, 2021, 11 pages.
International Preliminary Report on Patentability of International Patent Application No. PCT/2020/070654, dated Apr. 28, 2022, 8 pages.

* cited by examiner

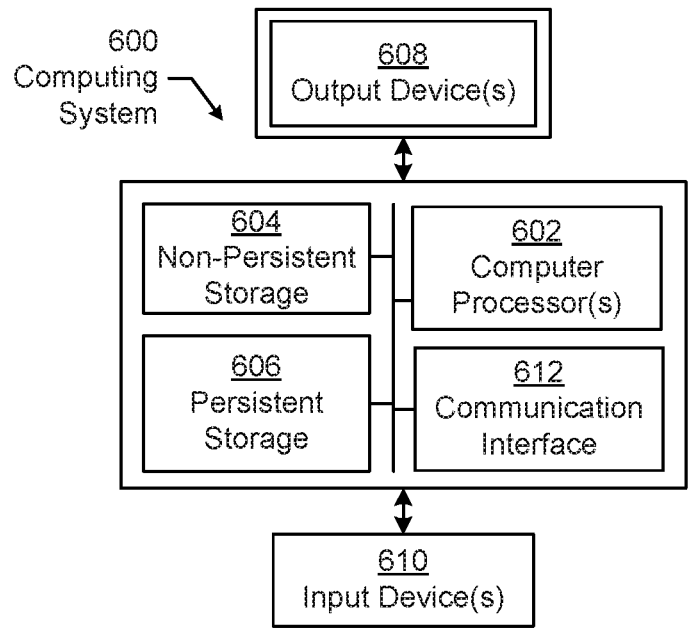
*FIG. 6.1*
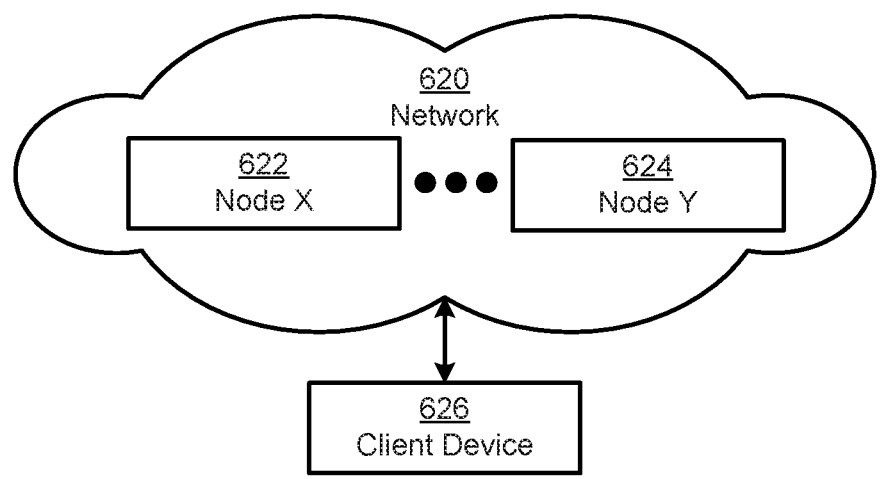
*FIG. 6.2*

INTELLIGENT POWER MANAGEMENT SYSTEM

CROSS-REFERENCE TO RELATED APPLICATION

This application is a continuation of U.S. patent application Ser. No. 16/655,396, filed Oct. 17, 2019, now U.S. Pat. No. 11,920,438, which is incorporated by reference herein in its entirety.

BACKGROUND

Various network devices, electric power generators and motors may be disposed throughout a drilling rig in order to control various operations on the drilling rig. These network devices may control drilling equipment, monitor the performance of the drilling rig, and/or perform various maintenance operations with respect to the drilling rig. In particular, these network devices may include sensors that collect sensor measurements, system requirement, and fuel requirement around the drilling rig. Accordingly, various problems exist in regard to effective utilization of power management system based on sensor data between different network devices and electric power generators on the drilling rig.

SUMMARY

In general, in one aspect, embodiments relate to a method that includes obtaining, from a digital drilling program and by a drilling management network, a drilling operation sequence of the drilling rig. The drilling management network is coupled to a drilling rig, rig equipment, and various electric power generators. The method includes determining, by the drilling management network, a power management sequence that matches an electric power capacity of the drilling rig to an electric power consumption of the rig equipment. The method further includes executing, by the drilling management network, the power management sequence to the rig equipment and the electric power generators.

In general, in one aspect, embodiments relate to a system that includes a sensor device. The system includes various electric power generators and rig equipment. The system further includes a drilling management network coupled to the sensor device, the electric power generators, rig equipment, and a drilling rig, the drilling management network comprising various network elements. and a power manager coupled to the drilling management network. The power manager includes a computer processor and includes functionality for obtaining a drilling operation sequence of the drilling rig from a digital drilling program. The power manager includes functionality for determining a power management sequence that matches an electric power capacity of the drilling rig to an electric power consumption of the rig equipment. The power manager further includes functionality for executing the power management sequence to the rig equipment and the electric power generators.

In general, in one aspect, embodiments relate to a non-transitory computer readable medium storing instructions executable by a computer processor. The instructions include functionality for obtaining, over a drilling management network, a drilling operation sequence from a digital drilling program. The drilling management network is coupled to a drilling rig, rig equipment, and various electric power generators. The instructions include functionality for determining a power management sequence that matches an electric power capacity of the drilling rig to an electric power consumption of the rig equipment. The instructions further include functionality for executing, over the drilling management network, the power management sequence to the rig equipment and the electric power generators.

Other aspects of the disclosure will be apparent from the following description and the appended claims.

BRIEF DESCRIPTION OF DRAWINGS

FIGS. 6.1 and 6.2 show a computing system in accordance with one or more embodiments.

DETAILED DESCRIPTION

Figure 1:
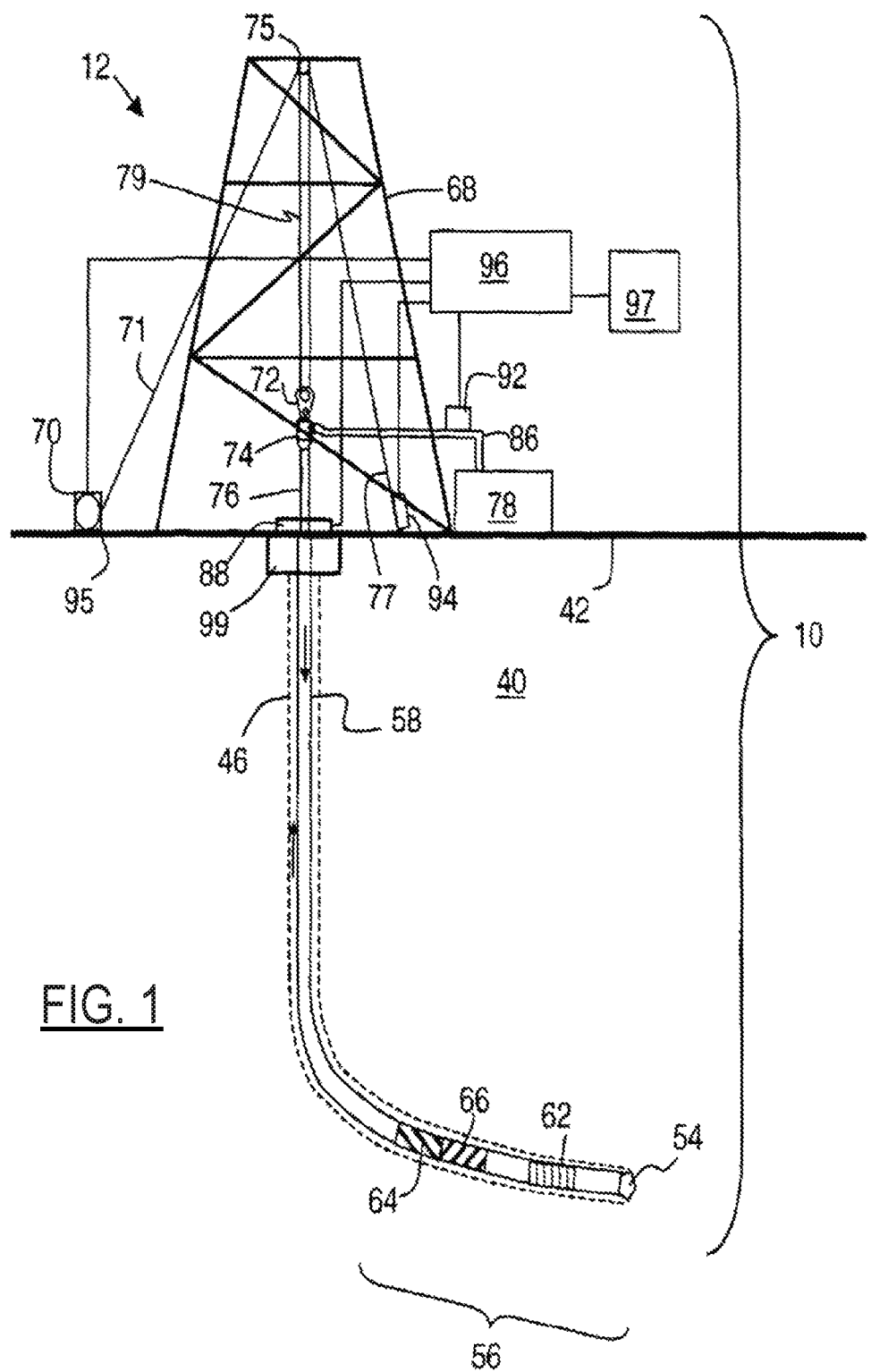
FIGS. 1, 2 and 3 show systems in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and various methods for managing electric power consumption throughout a drilling rig and/or drilling management network. Specifically the system may implement an automated process for managing transient power spike(s) and loads by turning on and off electric power generators. This automated process may be orchestrated by a power manager, for example. As such, a power manager may change the number of online electric power generators/motors based on the future power consumption requirements of the drilling rig. Accordingly, the power manager may regulate the automated startup process of various electric power generators, electric motors, and/or drilling operations through the drilling management network using commands. Thus, a drilling management network may execute a power management sequence with rig equipment and electric power generators according to various drilling operations described within a digital drilling program.

In particular, the power manager may estimate a projected power consumption of the drilling rig using current power consumption, transient loads, various equipment operation states. For example, the power management may adjust a power management sequence in real time. Where sudden transient loads result from changes in rig equipment or electric generators, the power management may address these changes by automatically changing electric power capacity of a drilling rig. Thus, the power manager may efficiently manage the start and stop times of rig equipment to reduce transient loads for optimized drilling operation and manage device timings within a drilling rig to match power supply (such as to prevent blackouts or reduce electromagnetic or pressure pulse noise during various operations). Further, the power manager may determine the future power consumption requirements through a digital drilling program.

FIG. 1 shows a block diagram of a system in accordance with one or more embodiments. FIG. 1 shows a drilling system (10) according to one or more embodiments. Drill string (58) is shown within borehole (46). Borehole (46) may be located in the earth (40) having a surface (42). Borehole (46) is shown being cut by the action of drill bit (54). Drill bit (54) may be disposed at the far end of the bottom hole assembly (56) that is attached to and forms the lower portion of drill string (58). Bottom hole assembly (56) may include a number of devices including various subassemblies. Measurement-while-drilling (MWD) subassemblies may be included in subassemblies (62). Examples of MWD measurements may include direction, inclination, survey data, downhole pressure (inside the drill pipe, and/or outside and/or annular pressure), resistivity, density, and porosity. Subassemblies (62) may also include a subassembly for measuring torque and weight on the drill bit (54). The signals from the subassemblies (62) may be processed in a processor (66). After processing, the information from processor (66) may be communicated to pulser assembly (64). Pulser assembly (64) may convert the information from the processor (66) into pressure pulses in the drilling fluid. The pressure pulses may be generated in a particular pattern which represents the data from the subassemblies (62). The pressure pulses may travel upwards through the drilling fluid in the central opening in the drill string and towards the surface system. The subassemblies in the bottom hole assembly (56) may further include a turbine or motor for providing power for rotating and steering drill bit (54). Alternatively, the signals from subassembly 62 may be transmitted to the surface via other telemetry means, such as EM telemetry, or wired drillpipe, etc.

The drilling rig (12) may include a derrick (68) and hoisting system, a rotating system, and/or a mud circulation system, for example. The hoisting system may suspend the drill string (58) and may include draw works (70), fast line (71), crown block (75), drilling line (79), traveling block and hook (72), swivel (74), and/or deadline (77). The rotating system may include a kelly (76), a rotary table (88), and/or engines (not shown). The rotating system may impart a rotational force on the drill string (58). Likewise, the embodiments shown in FIG. 1 may be applicable to top drive drilling arrangements as well. Although the drilling system (10) is shown being on land, those of skill in the art will recognize that the described embodiments are equally applicable to marine environments as well.

The mud circulation system may pump drilling fluid down an opening in the drill string. The drilling fluid may be called mud, which may be a mixture of water and/or diesel fuel, special clays, and/or other chemicals. The mud may be stored in mud pit (78). The mud may be drawn into mud pumps (not shown), which may pump the mud though standpipe (86) and into the kelly (76) through swivel (74), which may include a rotating seal. Likewise, the described technologies may also be applicable to underbalanced drilling. If underbalanced drilling is used, at some point prior to entering the drill string, gas may be introduced into the mud using an injection system (not shown).

The mud may pass through drill string (58) and through drill bit (54). As the cutting elements of the drill bit (54) grind and gouge the earth formation into cuttings, the mud may be ejected out of openings or nozzles in the drill bit (54). These jets of mud may lift the cuttings off the bottom of the hole and away from the drill bit (54), and up towards the surface in the annular space between drill string (58) and the wall of borehole (46).

At the surface, the mud and cuttings may leave the well through a side outlet at bellnipper (not shown) above blowout preventer (99) and through mud return line (not shown). Blowout preventer (99) comprises a pressure control device and associated seal. The mud return line may feed the mud into one or more separator (not shown) which may separate the mud from the cuttings. From the separator, the mud may be returned to mud pit (78) for storage and re-use.

Various sensor devices may be placed on the drilling rig (12) to take measurements of the rig equipment. In particular, a hookload may be measured by hookload sensor (94) mounted on deadline (77), block position and the related block velocity may be measured by a block sensor (95) which may be part of the draw works (70). Surface torque may be measured by a sensor device on the rotary table (88). In another embodiment, surface torque may be measured through instrumentation on or below the top drive, or through measuring top drive current. Standpipe pressure may be measured by pressure sensor (92), located on standpipe (86). Signals from these measurements may be communicated to a surface processor (96) or other network elements (not shown) disposed around the drilling rig (12). In addition, mud pulses traveling up the drill string may be detected by pressure sensor (92). For example, pressure sensor (92) may include a transducer that converts the mud pressure into electronic signals. The pressure sensor (92) may be connected to surface processor (96) that converts the signal from the pressure signal into digital form, stores and demodulates the digital signal into useable MWD data. According to various embodiments described above, surface processor (96) may be programmed to automatically detect one or more rig states based on the various input channels described. Surface processor (96) may be programmed, for example, to carry out an automated event detection as described above. Surface processor (96) may transmit a particular rig state and/or event detection information to user interface system (97) which may be designed to warn various drilling personnel of events occurring on the rig and/or suggest activity to the drilling personnel to avoid specific events. All of the above described components of a drilling system consume power, and embodiments of the present disclosure relate to a system and method for intelligently managing the power requirements for these and other rig equipment.

Figure 2:
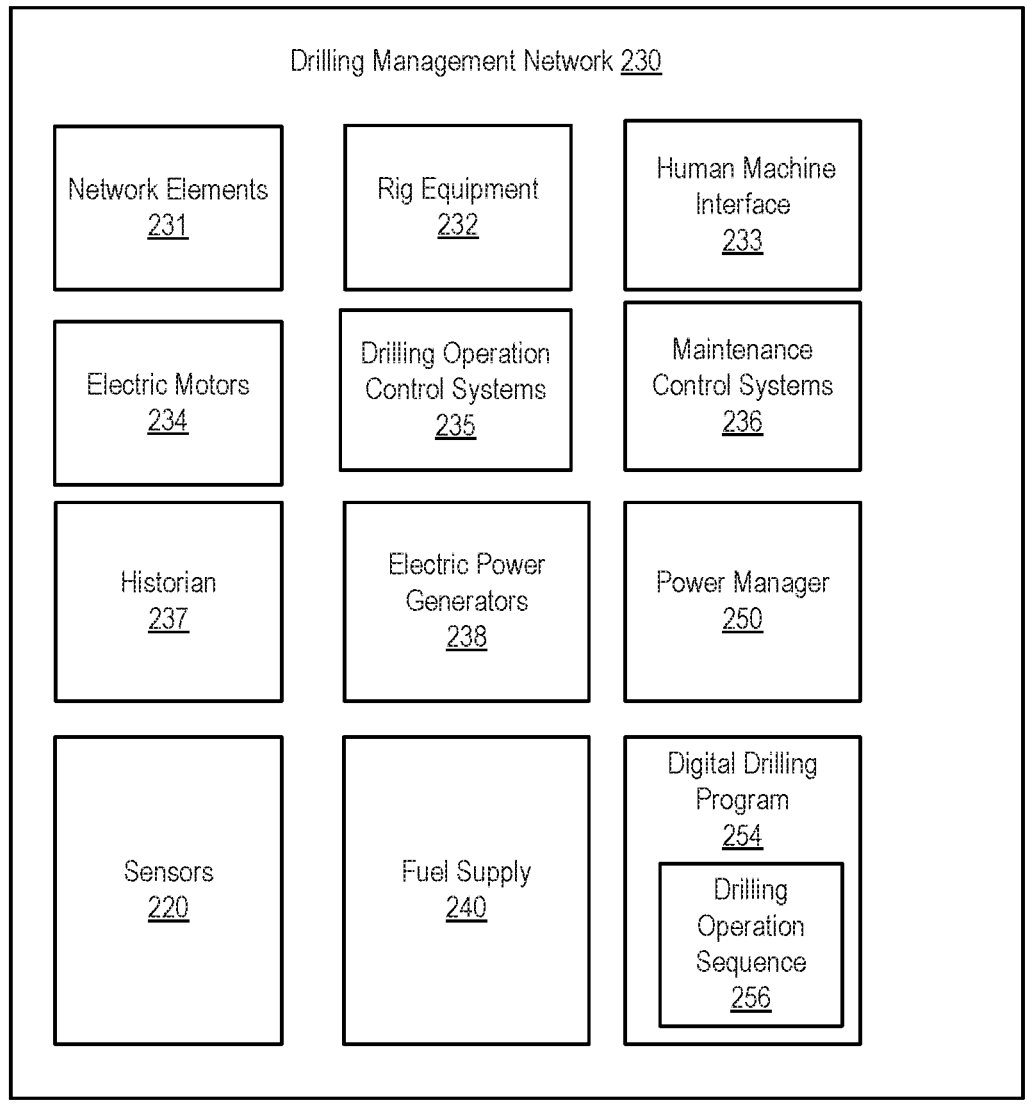

Turning to FIG. 2, FIG. 2 shows a block diagram of a system in accordance with one or more embodiments. As shown in FIG. 2, a drilling management network (230) may include various sensors (e.g., sensors (220)), a human machine interface (HMI) (e.g., HMI (233)), a historian (e.g., historian (237)), and various network elements (e.g., network elements (231)). The drilling management network (230) may further include rig equipment (e.g., rig equipment (232)) such as draw works (70), top drive, mud pumps and other components described above in FIG. 1 and the accompanying description).

The drilling management network (230) may further include various drilling operation control systems (e.g., drilling operation control systems (235)) and various maintenance control systems (e.g., maintenance control systems (236)). Drilling operation control systems and/or maintenance control systems may include, for example, programmable logic controllers (PLCs) that include hardware and/or software with functionality to control one or more processes performed by the rig equipment (232), including, but not limited to the components described in FIG. 1. Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the rig equipment, a drilling data acquisition and monitoring system that is used to acquire drilling process and equipment data and to monitor the operation of the drilling process, or a drilling interpretation software system that is used to analyze and understand drilling events and progress.

In one or more embodiments, a drilling management network may include a digital drilling program (e.g., digital drilling program (254)) that describes one or more drilling operation sequences (e.g., drilling operation sequence (256)). For example, a digital drilling program may be a digital description of drilling operations using rig equipment operation for a well construction. The digital description may include an estimated power consumption of rig equipment at different drilling operations. Thus, the digital drilling program may be operated by one or more network devices in the drilling management network (e.g., a human machine interface (233), a power manager (250)), etc.). Furthermore, the drilling operations in a digital drilling program may be automated based on various detected conditions around the drilling rig and sensor data. Likewise, the digital drilling program may include various user inputs from a human operator for controlling drilling operations. In some embodiments, a digital drilling program may include operation parameters that may be static or variable during a drilling operation sequence based on changes in drilling operation states around the drilling management network.

In some embodiments, a drilling operation sequence may include a predetermined order of scheduled events at a drilling rig or drilling management network to perform one or more drilling operations along with the corresponding operation parameters. For example, a drilling operation sequence may include a mud pump operation, a drill bit operation, reaming of a borehole, etc. Likewise, a drilling operation sequence may correspond to events at different drilling depths of a borehole. In one or more embodiments, the power manager may determine the operation sequence in order to manage the timings of the start and stop of various equipment to reduce transient loads for optimized drilling operation and manage the timings of the start and stop of various equipment to match power supply (such as to prevent blackout).

In one or more embodiments, the drilling management network (230) may include a power manager (e.g., power manager (250)). For example, the power manager may be a centralized processing device that includes hardware and/or software. The power manager may be coupled to a digital drilling program or be part of the digital drilling program. A power manager may include functionality for determining various equipment operation states, managing the timings of the start and stop of various equipment to manage sudden transient power spike to optimize drilling operation, managing the timings of the start and stop of various equipment to match power supply, and transmitting various generator commands and/or motor commands to coordinate with the generators. Likewise, the power manager (250) may obtain sensor data from various devices, e.g., sensors (220) and various control systems on the drilling management network (230). Moreover, the power manager (250) may include a computer processor similar to the computer processor (602) described below in FIG. 6.1 and the accompanying description. Moreover, the drilling management network (230) may include various network elements (e.g., network elements (231)) and/or various electric motors (e.g., electric motors (234)). For example, the electric motors (234) may be a continuous-duty universal motors, brushless DC motors, and/or synchronous single phase AC motors.

The drilling management network (230) may further include a fuel supply (240) and various electric power generators (e.g., electric power generators (238)). A fuel supply may include hardware and/or software that includes functionality for monitoring the amount of fuel stored in the fuel supply. In one or more embodiments, the fuel supply is a moveable container that includes functionality for distributing fuel to various devices around a drilling rig and/or drilling management network. An electric power generator may include hardware and/or software for converting fuel into electric energy for operating one or more devices around a drilling rig. For example, an electric power generator may be a diesel engine-generator. Further, the fuel supply (240) may send fuel to the electric power generators (238) which transmit electricity to run the electric motors (234) of the drilling management network (230).

Keeping with FIG. 2, sensors may include hardware and/or software that includes functionality to obtain one or more sensor measurements, e.g., a sensor measurement of an environment condition proximate the sensors (220). The sensors may process the sensor measurements into various types of sensor data. For example, the sensors may include functionality to convert sensor measurements obtained from sensor data into a communication protocol format for the drilling management network (230). The sensors may include pressure sensors, torque sensors, rotary switches, weight sensors, position sensors, microswitches, etc. The sensors may include smart sensors. In some embodiments, the sensors may include sensor circuitry without a communication interface or memory. For example, the sensors may be coupled with a computer device that transmits sensor data over a drilling management network.

In one or more embodiments, sensor data may be sent over the drilling management network (230) in data packets using a communication protocol. Sensor data may include sensor measurements, processed sensor data based on one or more underlying sensor measurements or parameters, metadata regarding the sensors such as timestamps and sensors identification information, content attributes, sensor configuration information such as offset, conversion factors, etc. As such, the sensors (220) may act as a network node and/or an endpoint on the drilling management network (230). In one embodiment, one or more sensors may connect to the drilling management network through a power-over-Ethernet network.

In one or more embodiments, the human machine interface (233) may be hardware and/or software coupled to the drilling management network (230). For example, the HMI (233) may allow the operator to interact with the drilling system, e.g., to send a command to operate an equipment, or to view sensor information from rig equipment. The human machine interface may include functionality for presenting data and/or receiving inputs from a user regarding various drilling operations and/or maintenance operations. For example, a human machine interface may include software to provide a graphical user interface (GUI) for presenting data and/or receiving control commands for operating a drilling rig. A network element may refer to various hardware components within a network, such as switches, routers, hubs or any other logical entities for uniting one or more physical devices on the network. In particular, a network element, the human machine interface, and/or the historian may be a computing system similar to the computing system (600) described in FIGS. 6.1 and 6.2, and the accompanying description.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
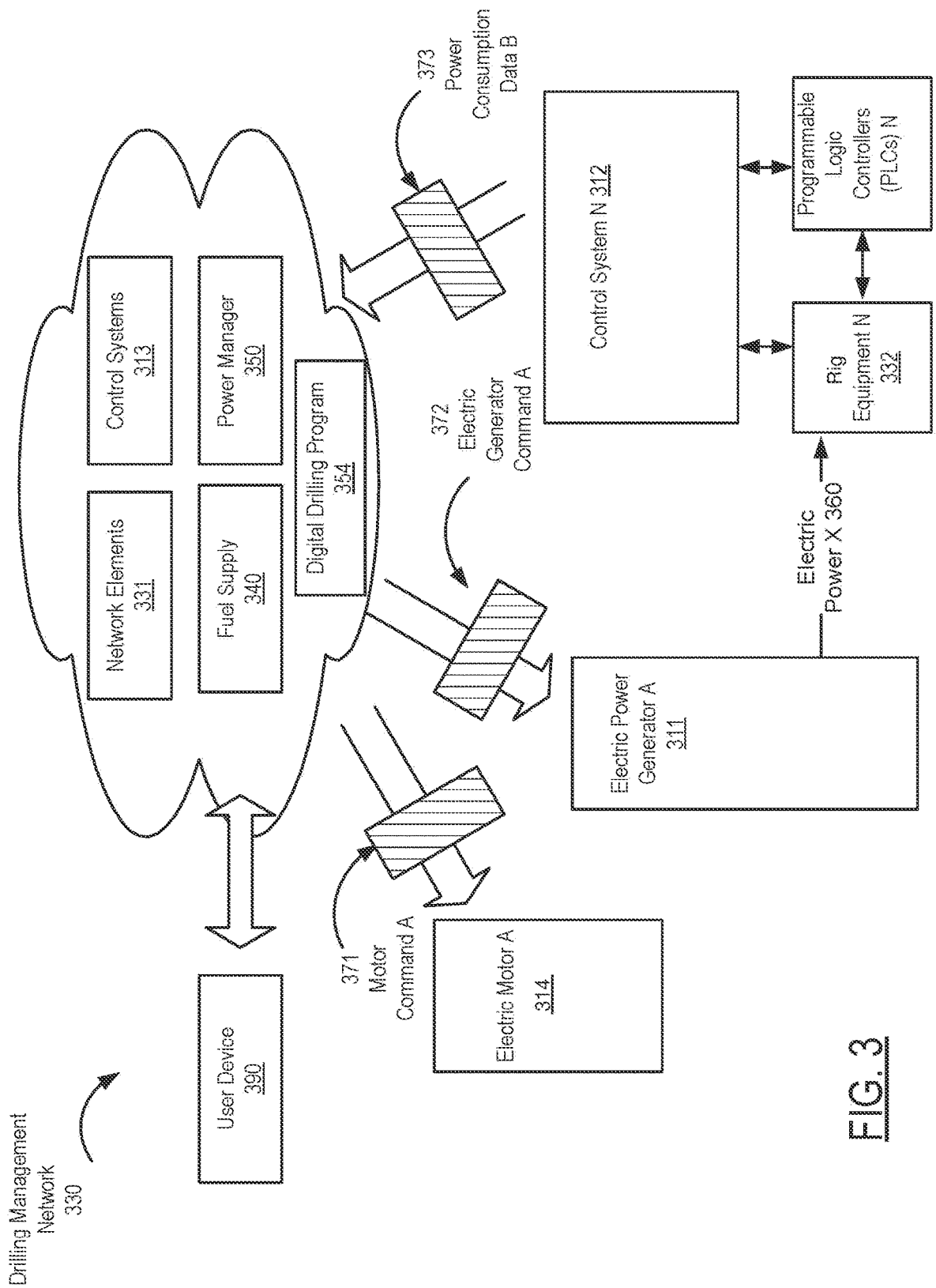

Turning to FIG. 3, FIG. 3 shows a block diagram of a system in accordance with one or more embodiments. The following example is for explanatory purposes only and not intended to limit the scope of the invention. As shown in FIG. 3, a drilling management network (330) may include various user devices (e.g., user device (390)), various network elements (e.g., network elements (331)), various fuel supplies (e.g., fuel supply (340)), a power manager (e.g., power manager (350)), a digital drilling program (e.g., digital drilling program (354)), and various control systems (e.g., control system N (312) and control systems (313)). The user devices may include hardware and/or software coupled to the drilling management network (330), and which includes functionality for presenting data and/or receiving inputs from a user regarding various drilling operations and/or maintenance operations performed within the drilling management network (330). For example, a user device may include personal computers, smartphones, human machine interfaces, and any other devices coupled to a network that obtain inputs from one or more users, e.g., by providing a graphical user interface (GUI). Likewise, a user device may present data and/or receive control commands from a user for communicating with a digital drilling program for operating a drilling rig.

In one or more embodiments, the drilling management network (330) includes various electric power generators (e.g., electric power generator A (311)) operating on the fuel supply (340) and electric motors (e.g., electric motor A (314). As shown in FIG. 3, the electric power generator A (311) provides electric power (e.g., electric power X (360)) to the rig equipment N (332). Accordingly, one or more devices and/or systems on the drilling management network (330) may transmit data packets, e.g., sensor data or power consumption data, to the user device (390) and/or receive data packets from the control systems N (312) regarding the power requirements and consumption. For example, power consumption data (e.g., power consumption data B (373)) may be sent over the drilling management network (330) to the power manager (350) using a communication protocol. Power consumption data may include estimation of a projected power consumption of the drilling rig based on a current power consumption, various equipment operation states and design parameters, number of electric power generators, generator and motor working conditions (on/off, ready or under or needing repair or maintenance, etc.), timing of the start and stop of various equipment to optimize drilling operation and so forth.

In some embodiments, the power manager may manage sudden transient loads by transmitting various commands (e.g., electric generator command A (372) and motor command A (371)) over the drilling management network to implement the adjusted power management sequence. For example, sudden transient loads may result when an insufficient number of electric power generators and/or electric motors are online, or are running very close to the rated load, which may lead the startup transients to overload the system. In particular, the power manager may transmit the electric generator command A (372) to the electric power generator based on the power consumption data B (373). Using the motor command A (371), for example, the power manager determines whether to enable, disable, or bypass an electric motor to a drilling operation sequence in accordance with one or more embodiments.

In one or more embodiments, a power manager may transmit generator commands to various electric power generators to manage usage within a drilling management network. More specifically, the power manager may determine a drilling operation sequence from the digital drilling program in order to match an electric power capacity of a drilling rig to an electric power consumption of the drilling rig. Based on the electric power consumption, the power manager may use generator commands to distribute electric power generation among various generators evenly to avoid hardware malfunctions and/or extend the lifetime of each individual generator. Thus, a power manager may equalize the number of hours that an electric power generator is online. In some embodiments, a power manager performs similar tasks with motors and motor commands in the drilling rig. Likewise, if one electric power generator is overused in contrast to other electric power generators, the overused electric power generator may fail prematurely.

Figure 4:
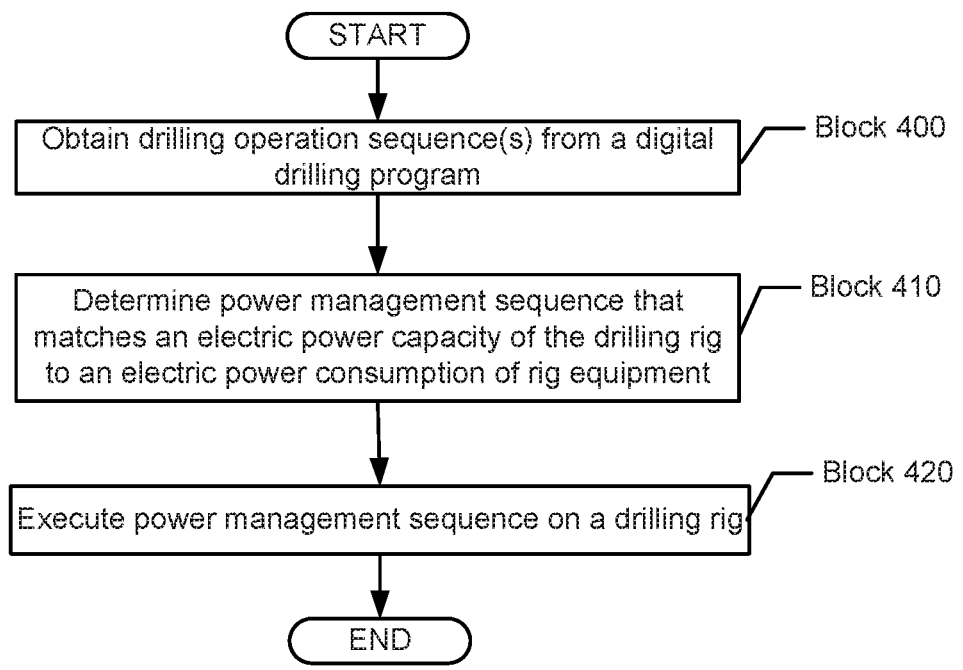
FIG. 4 shows a flowchart in accordance with one or more embodiments.

Turning to FIG. 4, FIG. 4 shows a flowchart in accordance with one or more embodiments. Specifically, FIG. 4 describes a general method for executing a power management sequence. One or more blocks in FIG. 4 may be performed by one or more components (e.g., power manager (250)) as described in FIGS. 1 and/or 2. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, one or more drilling operation sequences are obtained from a digital drilling program in accordance with one or more embodiments. For example, various well input parameters may be determined for a wellbore. Using the well input parameters, a digital drilling program may be obtained for a sequence of drilling operations to construct the wellbore. For example, a power manager may select a digital drilling program that corresponds to a particular drilling operation sequence from multiple preexisting drilling operation sequences. Likewise, a user may select and/or modify a preexisting drilling operation sequence within a digital drilling program based on the well input parameters.

In Block 410, a power management sequence is determined that matches an electric power capacity of a drilling rig to an electric power consumption of rig equipment in accordance with one or more embodiments. For example, a power management sequence may correspond to a predetermined order defining different amounts of electric power for use by equipment. An initial power management sequence may be obtained from a digital drilling program, for example. Likewise, a digital drilling program may specify a particular number of electric generators at different points in time of a drilling operation sequence. Accordingly, a power manager can match the electric capacity of a drilling rig to these different points in time.

In one or more embodiments, a power manager may automatically adjust a drilling operation sequence to match electric power capacity of a drilling rig. For example, a power manager may determine the availability of actual power and fuel in the drilling rig, including, for example, the number of electric power generators and their equipment operation status (on/off, ready or under repair, etc.). Thus, the power manager may use information to produce an adjusted drilling operation sequence, e.g., in order to calibrate and/or update the power consumption for future drilling operations. Likewise, the power manager may also determine different power management sequences based on changes and variable operations in a drilling operation sequence. Accordingly, as an electric power consumption increases or decreases at a drilling rig, the power manager may increase or decrease the electric power capacity of the drilling rig to match the electric power consumption.

In some embodiments, a power management sequence may be determined using power consumption data and one or more pre-stored algorithms. In one or more embodiments, for example, the power manager of the drilling management network adjusts the drilling operation sequence based on one or more changes in a drilling path performed by the drilling rig to produce an adjusted drilling operation sequence. Further, the power manager determines whether to change the number of electric power generators and adjusts the power management sequence (e.g., by changing operation parameters, order of the drilling operations, etc.). The power manager may then produce an adjusted power management sequence based on an adjusted drilling operation sequence and the updated power consumption within a job package. In other words, the power manager determines adequate power by analyzing the allocation of electric power generators and/or the timing of events in a drilling operation sequence.

In one embodiment, the power manager may use the software application to estimate power consumption at different drilling operation sequences in a job package based on design parameters of various equipment. The power manager may obtain the fuel data, e.g., an amount of fuel located in a fuel supply at a drilling rig. The fuel data may be used in conjunction with power consumption data to manage electric power over a drilling management network.

In some embodiments, a power manager may obtain power consumption data in order to evaluate a projected electric power consumption of rig equipment. For example, a power manager may calculate a required electric power capacity within a drilling operation sequence. Based on the required electric power capacity, the power manager may compare the projected power consumption with the current power management sequence. For example, power consumption data may include anticipated power demand, electromagnetic and/or pressure pulse noise readings for certain operation, and electric power readings in real time, over a predetermined time interval. Likewise, power consumption data may correspond to various parameter values, such as voltage levels, amounts of current, and quantities of power, e.g., in kilojoules. The power consumption data for various network devices may be aggregated by a power manager in a form of a job package or software application in order to determine historical trends within a drilling rig.

In Block 420, a power management sequence is executed on a drilling rig in accordance with one or more embodiments. In particular, the power manager may apply the power management sequence to rig equipment and electric power generators coupled to a drilling management network. In some embodiments, for example, the power manager increases the number of electric power generators at a drilling rig to match projected electric power consumption of rig equipment in a drilling operation sequence. In another embodiment, the power manager disables or shuts down active electric power generators if the upcoming drilling operation requires less power than the existing power level. In some other embodiments, the power manager manages changes in the number of online electric power generators in order avoid the startup transients (e.g., that last for a few seconds) that might push the system over the edge.

In some embodiments, the power manager may coordinate the start and stop times of various equipment by transmitting various commands. As such, a power manager may transmit generator commands to electric power generators and motor commands to electric motors for managing a power management sequence. If a motor is removed from a drilling operation sequence, for example, a power manager may transmit another generator command to remove an electric generator. In particular, the length of how long it takes to reach rated speeds on the motor (e.g., larger motors or slow starting equipment) may be taken into account for inhibiting the start of the electric motor to protect engine overload. Based on different power requirements of the power management sequence, the power manager may transmit a second generator command that causes the second electric power generator to provide electric power to the drilling rig. Further, in response to the second electric power generator providing electric power, the power manager transmits a motor command that causes the electric motor to initiate operations in accordance with one or more embodiments. In one or more embodiments, based on the amount of fuel, the power manager transmits various generator commands to one or more electric power generators to manage automatically a projected amount of electric power for one or more drilling operations.

In one or more embodiments, the power manager may use a job package or software application to adjust the start times and/or stop times and/or the timing of changing operation parameters of various equipment to reduce electromagnetic and/or pressure pulse noises during various operations, such as telemetry operations. For example, the start times and/or stop time and/or the timing of changing operation parameters may be adjusted in response to various amounts of noise detected during previous operations, so as to minimize the interference with ongoing telemetry operations. Thus, the power manager may automatically update the power management sequence based on changes in a drilling operation sequence or new issues detected by sensor devices around the drilling management network.

In some embodiments, the power manager gives different rig equipment levels of precedence during the power management sequence. In particular, where rig equipment is identified with a higher degree of precedence, the power manager may allocate power to the rig equipment with a higher precedence under conditions where electric capacity cannot be adjusted. Moreover, the power manager may also transmit commands to shutdown rig equipment in order that precedential rig equipment can obtain a desired amount of electric power within the drilling management network.

Figure 5:
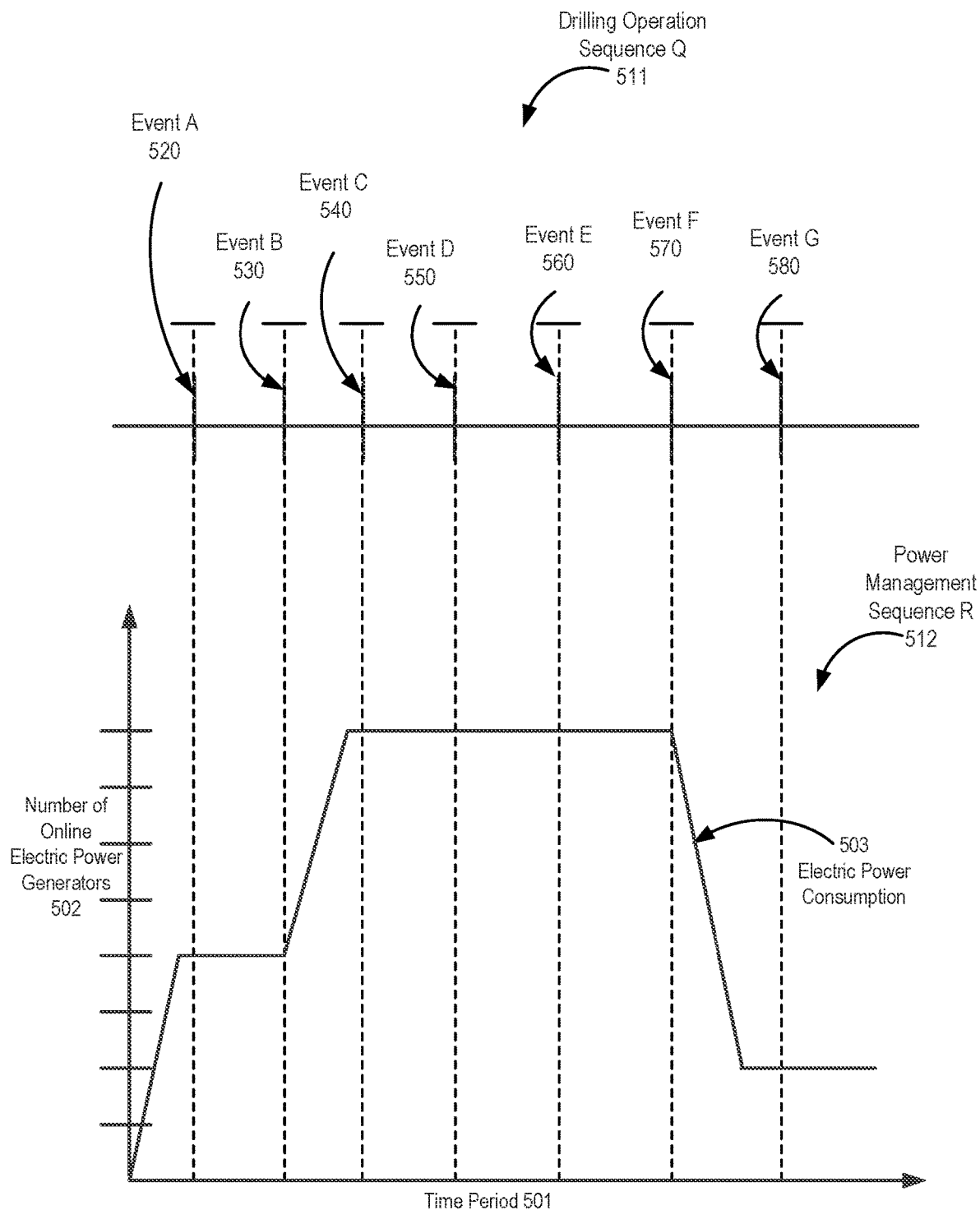
FIG. 5 shows an example in accordance with one or more embodiments.

Turning to FIG. 5, FIG. 5 provides an example of a power management sequence R (512) for a drilling operation sequence Q (511). The following example is for explanatory purposes only and not intended to limit the scope of the disclosure. Turning to FIG. 5, the drilling operation sequence Q (511) includes a sequential series of time events (e.g., event A (520), event B (530), event C (540), event D (550), event E (560), event F (570), and event G (580)). For example, during drilling, a drill bit on the end of a drill string is rotated to cut the earth formation, while a drilling mud is pumped through the drill string and bit into the hole. As the drill bit cuts the rock, the mud moves those cuttings up the well. The rock cuttings are put through a "shaker" that removes them from the mud. The mud is then reused by the mud pump. After a first section of the well is drilled, the bit and drill string may be pulled out of the hole, and a casing string may be run into the hole and cemented in place to ensure that the well maintains its shape and structure. Upon setting, the well may be drilled to further depths with multiple sections until total depth is reached. It is understood that the drilling operation sequence Q shown in FIG. 5 may be substantially longer to drill to total depth, and that the example set forth here may represent one part of a drilling operation sequence.

For example, at event A (520), a drill string is activated, e.g., a power and fuel requirement increase occurs at a drilling rig and thus the required number of online electric power generators (502) is increased. Besides normal system requirements, a stuck drill string, reaming, or pulling out of hole, may increase the sudden requirement of online electric power generators or motors. For example, the stuck drill may occur due to adhesion on not moving the drill string for a significant amount of time, keyhole sticking during tripping, differentially due to a large difference between formation pressure and wellbore pressure, and so forth.

In one or more embodiments, between event B (530) and event C (540), the power manager detects the requirement of fuel and electric power generators increases as a drill string goes deeper into a borehole. As shown, between event C (540) to event F (570), the number of online electric power generators (502) remains the same. As shown in FIG. 5, at event D (550), event E (560) and event F (570), the power manager detects the power consumption (503) remains same and thus there is no increase in number of electric power generators.

In some embodiments, after event F (570), the power manager detects a sharp drop in the requirement of number of electric power generators, for example, as a drill string is re-run into a hole. At event G (580), the power manager carries out maintenance operation A and shuts down/ramp down/bypass the number of online electric power generators (502) in case there is no need to maintain existing power level. With respect to event F (570) and event G (580), these may be well-timed events to allow some time for the electric power generators to shutdown gracefully. As such, the deactivation of operations in event D (550), event E (560), event F (570), and event G (580) may include graceful shutdowns and/or forceful shutdowns.

While the drilling operation sequence Q (511) in FIG. 5 illustrates one sequence of events for an orchestrated power management, other sequences of events are contemplated that include adding and/or removing events from a drilling operation sequence. Likewise, operations of various components may be terminated in a different order from the drilling operation sequence Q (511).

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:
1. A method comprising:
obtaining, from a digital drilling program and by a power manager coupled to a drilling management network, a drilling operation sequence indicating a predetermined order of scheduled events of a drilling rig, the drilling management network comprising a plurality of net- work elements and being coupled to the drilling rig, rig equipment, a sensor device, and a plurality of electric power generators;

determining, by the power manager, a power management sequence that matches an electric power capacity of the drilling rig to an electric power consumption of the rig equipment, wherein the determining the power management sequence comprises determining to change a number of online electric power generators, of the plurality of electric power generators, to match a projected electric power consumption of the rig equipment; and executing, by the power manager, the power management sequence to the rig equipment and the plurality of electric power generators, wherein the executing the power management sequence comprises:

automatically adjusting the drilling operation sequence based on power consumption data and rig power supply to produce an adjusted drilling operation sequence;

automatically adjusting operation parameters of the rig equipment for the adjusted drilling operation sequence;

changing the number of online electric power generators based on the adjusted drilling operation sequence and the adjusted operation parameters; and executing the adjusted drilling operation sequence on the drilling management network.

2. The method of claim 1, wherein the executing, by the power manager, the power management sequence further comprises transmitting, to an electric power generator among the plurality of electric power generators, a generator command based on the power management sequence.

3. The method of claim 1, wherein the digital drilling program comprises an estimated electric power consumption of the rig equipment for the drilling operation sequence.

4. The method of claim 1, wherein the digital drilling program comprises operation parameters of the rig equipment for the drilling operation sequence.

5. The method of claim 1, further comprising determining, by the power manager, a projected electric power consumption of the rig equipment based on the adjusted drilling operation sequence.

6. The method of claim 5, wherein the executing, by the power manager, the power management sequence to the rig equipment and the plurality of electric power generators comprises distributing electric power at least equal to the projected electric power consumption equally among the number of online electric power generators.

7. The method of claim 1, further comprising adjusting, in real-time, the power management sequence of the rig equipment in response to, and based on, a change in electric power capacity of the drilling rig or a change in electric power consumption of the rig equipment.

8. The method of claim 7, wherein the adjusting, in real-time, the power management sequence of the rig equipment comprises allocating available electric power capacity to particular rig equipment in order of a priority of the rig equipment.

9. The method of claim 7, further comprising detecting the change in the electric power consumption of the rig equipment based on a change in a drilling path, a stuck drill bit, a reaming operation, pulling out of a borehole, or rerunning into the borehole.

10. A system comprising:
a sensor device;
a plurality of electric power generators;
rig equipment;
a drilling management network coupled to the sensor device, the plurality of electric power generators, the rig equipment, and a drilling rig, wherein the drilling management network comprises a plurality of network elements; and a power manager coupled to the drilling management network, wherein the power manager comprises a computer processor and is configured to:

obtain, from a digital drilling program, a drilling operation sequence indicating a predetermined order of scheduled events of a drilling rig, wherein the drilling management network is coupled to the drilling rig, rig equipment, and a plurality of electric power generators;

determine a power management sequence that matches an electric power capacity of the drilling rig to an electric power consumption of the rig equipment, wherein the determining the power management sequence comprises determining to change a number of online electric power generators, of the plurality of electric power generators, to match a projected electric power consumption of the rig equipment; and execute the power management sequence to the rig equipment and the plurality of electric power generators, wherein the executing the power management sequence comprises:

automatically adjusting the drilling operation sequence based on power consumption data and rig power supply to produce an adjusted drilling operation sequence;

automatically adjusting operation parameters of the rig equipment for the adjusted drilling operation sequence;

changing the number of online electric power generators based on the adjusted drilling operation sequence and the adjusted operation parameters; and executing the adjusted drilling operation sequence on the drilling management network.

11. The system of claim 10, wherein the executing, by the power manager, the power management sequence further transmitting, to an electric power generator among the plurality of electric power generators, a generator command based on the power management sequence.

12. The system of claim 10, wherein the digital drilling program comprises an estimated electric power consumption of the rig equipment for the drilling operation sequence.

13. The system of claim 10, wherein the digital drilling program comprises operation parameters of the rig equipment for the drilling operation sequence.

14. The system of claim 10, further comprising determining, by the power manager, a projected electric power consumption of the rig equipment based on the adjusted drilling operation sequence.

15. The system of claim 14, wherein the executing, by the power manager, the power management sequence to the rig equipment and the plurality of electric power generators comprises distributing electric power at least equal to the projected electric power consumption equally among the number of online electric power generators.

16. The system of claim 10, further comprising adjusting, in real-time, the power management sequence of the rig equipment in response to a change in electric power capacity of the drilling rig or a change in electric power consumption of the rig equipment.

17. The system of claim 16, wherein the adjusting, in real-time, the power management sequence of the rig equipment comprises allocating available electric power capacity to particular rig equipment in order of a priority of the rig equipment.

18. A non-transitory computer readable medium storing instructions, the instructions executable by a computer processor for:

obtaining, from a digital drilling program and by a power manager coupled to a drilling management network, a drilling operation sequence indicating a predetermined order of scheduled events of a drilling rig, the drilling management network comprising a plurality of network elements and being coupled to the drilling rig, rig equipment, a sensor device, and a plurality of electric power generators;

determining, by the power manager, a power management sequence that matches an electric power capacity of the drilling rig to an electric power consumption of the rig equipment, wherein the determining the power management sequence comprises determining to change a number of online electric power generators, of the plurality of electric power generators, to match a projected electric power consumption of the rig equipment; and executing, by the power manager, the power management sequence to the rig equipment and the plurality of electric power generators, wherein the executing the power management sequence comprises:

automatically adjusting the drilling operation sequence based on power consumption data and rig power supply to produce an adjusted drilling operation sequence;

automatically adjusting operation parameters of the rig equipment for the adjusted drilling operation sequence;

changing the number of online electric power generators based on the adjusted drilling operation sequence and the adjusted operation parameters; and executing the adjusted drilling operation sequence on the drilling management network.

\* \* \* \* \*